No. 797,406. PATENTED AUG. 15, 1905.
D. P. COOPER.
FIFTH WHEEL.
APPLICATION FILED OCT. 22, 1903.

2 SHEETS—SHEET 2.

WITNESSES

INVENTOR
D. P. Cooper

UNITED STATES PATENT OFFICE.

DAVID P. COOPER, OF STRUTHERS, OHIO.

FIFTH-WHEEL.

No. 797,406. Specification of Letters Patent. Patented Aug. 15, 1905.

Application filed October 22, 1903. Serial No. 178,039.

*To all whom it may concern:*

Be it known that I, DAVID P. COOPER, of Struthers, Mahoning county, Ohio, have invented a new and useful Fifth-Wheel, of which the following is a full, clear, and exact description, reference being had to the accompanying drawings, forming part of this specification, in which—

Figure 1:
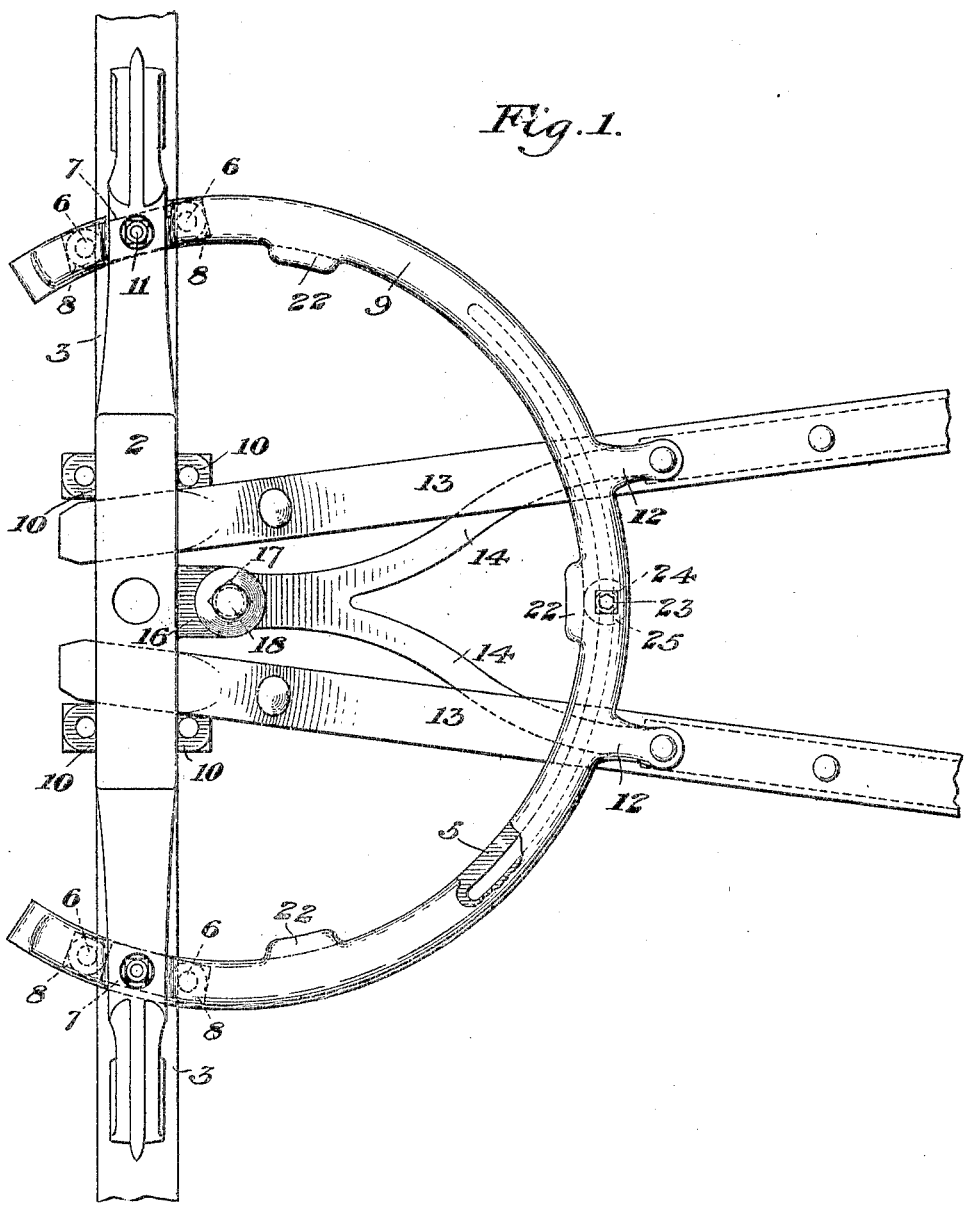
Figure 2:
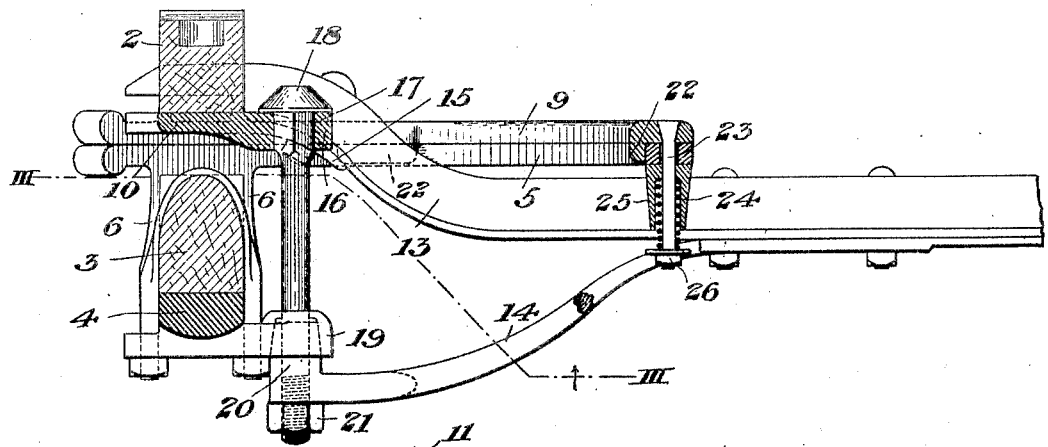
Figure 3:
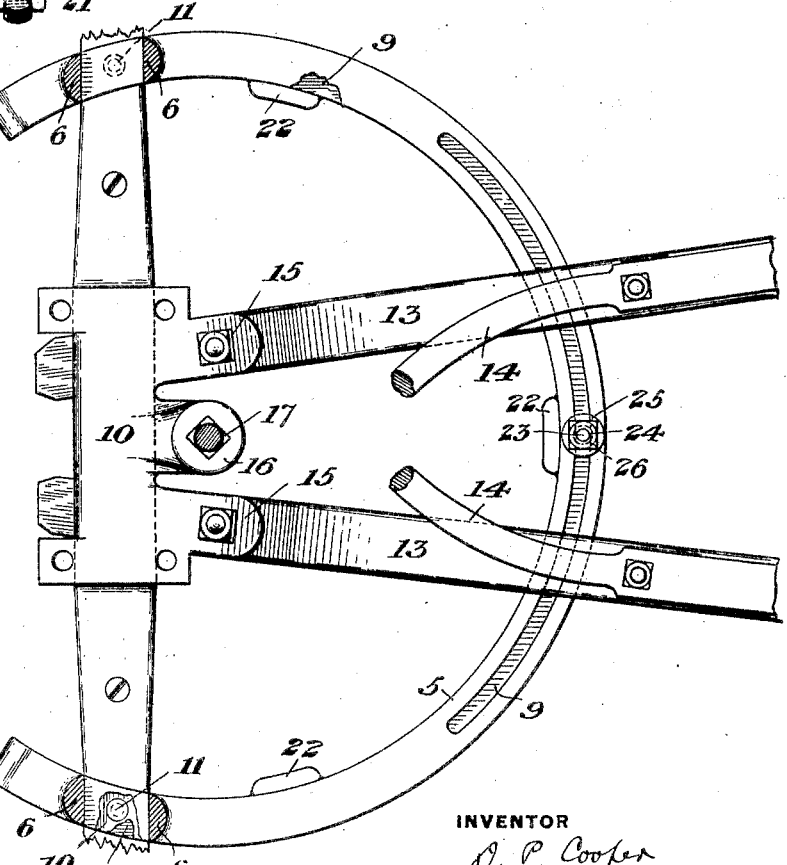

Figure 1 is a top plan view of my improved fifth-wheel. Fig. 2 is a vertical central section of the same, and Fig. 3 is a horizontal section on the line III III of Fig. 2 looking in the direction of the arrow.

My invention relates to the class of fifth-wheels, and is designed to simplify and improve their construction.

The principal feature of my invention lies in doing away with the usual pivot-bearing at the lower portion of the head-block and providing flanges or lugs upon one or both of the circle-plates, which coact with the other circle-plate at the side portions and serve as guides and side stops for the movement.

In the drawings, 2 represents the head-block, 3 the axle-bed, and 4 the axle. The lower circle-plate 5 is secured to the axle in any suitable manner, and I have shown it as provided with depending clip-legs 6 6 near its ends, these legs embracing the axle and axle-bed and extending through a clip-yoke 7. The clip-legs are provided with the usual nuts 8 8 below the clip-yoke. The upper circle-plate 9 is secured to the head-block in any suitable way, and I have shown its end portions as recessed to receive the ends of the head-block plate 10. Small countersunk bolts 11 extend through the head-block, the plate, and the ends of the upper circle-plate. The rear portion of the upper circle is provided with small brackets 12, which are bolted to the bent reaches 13, these bolts extending through the end portions of the forked brace 14. The head-block plate 10 has rearwardly-extending lugs 15, which are bolted to the front ends of the reaches, and at the center of the head-block plate is a rearwardly-projecting hub or boss 16, having an angular hole to receive the upper squared or angular portion 17 of the king-bolt 18. This king-bolt extends downwardly through a round hole in the rear extension of the king-bolt yoke 19 and also through a hole in the hub 20 at the front end of the brace 14. The securing-nut 21 is applied to the lower screw-threaded end of the king-bolt. The yoke 19 preferably has an upwardly-extending conical recess to receive the conical head of the hub 20. This takes the strain off the king-bolt and affords an extended bearing.

It will be noted that the only pivot of the king-bolt is where it passes through the king-bolt yoke 19, there being no pivot at its upper portion. When the axle turns, the king-bolt is held against turning and the collar on the king-bolt yoke turns around the fixed king-bolt and the conical head of hub 20.

To prevent side movement of one circle-plate relative to the other, I provide flanges or lugs 22, which project from one or both of the circle-plates and engage the other circle-plate. These lugs are preferably at the sides of the circle-plates and may be either on the outer portion or the inner portion. They may extend upwardly from the lower circle-plate or downwardly from the upper circle-plate and may, if desired, be extended to form a continuous flange. The use of these guide lugs or flanges enables me to do away with the upper pivot of the king-bolt, and thus greatly simplify the construction.

I preferably employ with my fifth-wheel an antirattling device and for this purpose have shown the lower circle-plate as slotted in its rear portion, a bolt 23, secured to the upper circle-plate, extending through the slot. A spiral spring 24 surrounds the bolt and is within a case 25, held by the nut 26 at the lower end of the bolt. By turning the nut the tension of the spring may be adjusted. It will be understood that any desirable device for preventing rattling may be used.

The advantages of my invention result from the simplifying of the fifth-wheel by doing away with the upper pivot of the king-bolt and the use of the projection on one circle-plate engaging the other. The construction is strong and efficient and neat in appearance.

Many changes may be made in the form and arrangement of the parts without departing from my invention.

I claim—

1. A fifth-wheel having a king-bolt with its only pivot at its lower portion, and upper circle-plates having an interfitting guide to prevent side movement; substantially as described.

2. A fifth-wheel having a non-rotatable king-bolt, a king-bolt yoke having a collar or hub arranged to turn around the lower portion of the king-bolt and constitute the only king-bolt pivot, and circle-plates having an interfitting flange or lugs; substantially as described.

3. A fifth-wheel having a non-rotatable king-bolt, a brace having a hub surrounding the lower portion of the king-bolt, a king-bolt yoke having a collar fitting around the hub of the brace, the king-bolt being free from any pivot in its upper portion, and circle-plates having an interfitting guide to prevent side movement; substantially as described.

In testimony whereof I have hereunto set my hand.

DAVID P. COOPER.

Witnesses:
JOHN MILLER,
H. M. CORWIN.